US005459198A

United States Patent [19]
Sharp

[11] Patent Number: 5,459,198
[45] Date of Patent: Oct. 17, 1995

[54] FLUOROINFUSED COMPOSITES, ARTICLES OF MANUFACTURE FORMED THEREFROM, AND PROCESSES FOR THE PREPARATION THEREOF

[75] Inventor: Kenneth G. Sharp, Landenberg, Pa.

[73] Assignee: E. I. du Pont de Nemours and Company, Wilmington, Del.

[21] Appl. No.: 282,690

[22] Filed: Jul. 29, 1994

[51] Int. Cl.⁶ ............................................. C08C 83/02
[52] U.S. Cl. ........................ 525/102; 525/903; 525/477; 525/446; 525/453; 525/104; 525/105; 525/106
[58] Field of Search .................... 525/903, 102, 525/477, 446, 453, 104, 105, 106

[56] References Cited

U.S. PATENT DOCUMENTS

| | | | |
|---|---|---|---|
| 4,250,074 | 2/1981 | Foscante et al. | 525/903 |
| 4,652,663 | 3/1987 | Takago et al. | 549/215 |
| 4,764,560 | 8/1988 | Mitchell | 524/506 |
| 5,180,845 | 1/1993 | Higley | 556/445 |
| 5,250,607 | 10/1993 | Comert et al. | 524/507 |
| 5,252,654 | 10/1993 | David et al. | 524/414 |

FOREIGN PATENT DOCUMENTS

WO94/06807  3/1994  WIPO ............................ C07F 7/18

OTHER PUBLICATIONS

"Perfluorinated Ionomer–Membrane Based Microcomposites" Maurity et al. ACS Symp. Ser pp. 401–417 1989.
L. H. Sperling, "Interpenetrating Polymer Networks: An Overview", in D. Klempner et al. (ed.), *Interpenetrating Polymer Networks*, American Chemical Society, Washington D.C., 1994, pp. 3–38.
Mark E. Dillon, "Silicone and Poly(tetrafluoroethylene) Interpenetrating Polymer Networks", in D. Klempner et al. (ed.), *Interpenetrating Polymer Networks*, American Chemical Society, Washington, DC, 1994, pp. 393–404.
Ning et al, *Polym. Bull. (Berlin)*, 12, 407–411, (1984).
Mauritz et al, "Multiphase Polym.: Blends Ionomers", *ACS Symp. Ser.* 395, 401, (1989).

Primary Examiner—Melvyn I. Marquis
Assistant Examiner—Margaret W. Glass

[57] ABSTRACT

Fluoroinfused composites exhibiting low surface energy and low kinetic coefficent of energy are prepared via contact of a swellable polymeric material with a solution comprising a swelling solvent, an organofluorosilane and a gelling agent.

24 Claims, No Drawings

FLUOROINFUSED COMPOSITES, ARTICLES OF MANUFACTURE FORMED THEREFROM, AND PROCESSES FOR THE PREPARATION THEREOF

FIELD OF THE INVENTION

This invention concerns the modification of the surface and regions adjacent to the surface of a swellable polymeric material and materials produced thereby.

TECHNICAL BACKGROUND

Low surface energy and a low kinetic coefficient of friction are desirable properties for certain polymeric materials. Fluoropolymers possess several highly useful material properties, including low surface energy, low chemical reactivity and low kinetic coefficient of friction (high lubricity). However, fluoropolymers are more expensive and more difficult to process than most other polymer-based materials. Simply overcoating less costly polymers with fluoropolymers is often impractical because of the high temperatures involved in the processing of the fluoropolymers and/or the poor adhesion of fluoropolymers to most other materials.

The requirements for an elastomeric material with high thermal stability are satisfied, for example, by silicone rubber. However, when utilized in photocopier rolls, this material shows undesirably high levels of retention of toner when functioning in duplex (double-sided) mode.

Modification of certain polymers to induce desirable properties is described in Ning et al., Polym. Bull. (Berlin) 1984, 12, 407–11 and in Mauritz et al., 1989, ACS Symp. Ser. 395 (Multiphase Polym.: Blends Ionomers), 401, wherein silica is deposited inside swollen polymers, and in U.S. Pat. No. 5,252,654 issued Oct. 12, 1993, which describes a polymeric composite of an organic polymer and an inorganic glassy polymer and a process for making such composites which are useful as protective coatings.

SUMMARY OF THE INVENTION

This invention provides a fluoroinfused composite comprising a swellable polymeric material having all or a portion thereof interpenetrated with a fluoropolysilicate network.

This invention also provides a process for the production of the above fluoroinfused composite comprising preparing a solution comprising at least one organofluorosilane, a swelling solvent, a gelling agent, and an optional network-forming metal alkoxide; contacting a swellable polymeric material with the solution; removing the polymeric material from the solution after allowing sufficient time for swelling and network formation to occur; and removing the solvent from the polymeric material to obtain the fluoroinfused composite.

This invention further provides a process for the production of the above-described fluoroinfused composite comprising pretreating a swellable polymeric material with a first solution comprising a swelling solvent, the first solution optionally further comprising either at least one organofluorosilane or a gelling agent; contacting the pretreated polymeric material with a second solution comprising the solvent, and one from the group consisting of: (i) a gelling agent and at least one organofluorosilane, provided an organofluorosilane is not present in the first solution; (ii) a gelling agent, provided the first solution comprises a solvent and at least one organofluorosilane, and a gelling agent is not present in the first solution; and (iii) at least one organofluorosilane, provided the first solution comprises a solvent and a gelling agent, and an organofluorosilane is not present in the first solution; removing the polymeric material from the second solution after allowing sufficient time for swelling and network formation to occur; and removing the solvent from the polymeric material to obtain the fluoroinfused composite. Whichever of the first or second solution comprises at least one organofluorosilane may optionally further comprise a network-forming metal alkoxide.

This invention also provides articles comprising the above-described fluoroinfused composites, e.g., photocopier fuser and pressure rolls, plain paper copier/facsimile machine rolls, laser jet printer machine rolls, gaskets, O rings, wiper blades, packaging film, fibers and flexible tubing.

The inventions of the present application provide fluoroinfused composites which exhibit low surface energy, a low kinetic coefficient of friction, and a decrease in surface roughness (for those materials exhibiting an initially rough surface) as compared to untreated samples leading to improved solvent resistance, improved lubricity and release character, reduced susceptibility to abrasive wear, and thus possess improved properties desirable in a variety of applications.

DETAILED DESCRIPTION OF THE INVENTION

This invention provides certain fluoroinfused composites comprising a swellable polymeric material having all or a portion thereof interpenetrated with a fluoropolysilicate network. The term "fluoroinfused" is used herein to mean that fluorine atoms constitute up to about 20 atomic percent of the chemical species infused in the near-surface regions of the composite to a depth of about 10–100 nm. The term "interpenetrated" is used herein to describe the relationship between the network formed in situ and the swellable polymeric material. This fluoropolysilicate network is mechanically interlocked and anchored within those chains of the swellable polymer material within the interpenetrated portion of the polymeric material and as such forms a composite with the polymeric material which does not require significant covalent bonding between the network and the polymeric material to maintain physical stability.

A swellable polymeric material (for both the composite and the process claimed herein) comprises polymeric material that when contacted with a swelling solvent absorbs the solvent into its interior leading to a dimensional change in the polymeric material. Polymeric material suitable for use in preparing the fluoroinfused composites of the present invention comprise elastomers and semi-crystalline polymers. Suitable elastomers include silicone rubber, butyl rubber, VITON® hexafluoropropylene/difluorovinyl copolymer, ethylene/propylene/hexadiene rubber, and polyurethane; and thermoplastic elastomers such as block copolymers of polybutylene terephthalate and long chain polyether glycols, such as HYTREL® polyester available from E. I. du Pont de Nemours and Company, Wilmington, Del. Suitable semicrystalline polymers include polyethylene terephthalate, polypropylene, polyvinyl chloride, polyester such as DACRON® polyester fiber available from E. I. du Pont de Nemours and Company, Wilmington, Del., and poly(ethylene-co-vinyl acetate). The non-elastomeric polymeric materials may be branched or linear, and all the polymeric materials must be swellable in a solvent. Preferred are elastomers such as silicone rubber and ethylene/propylene/hexadiene rubber.

The fluoropolysilicate network interpenetrating the polymeric material is formed by contacting the swellable polymeric material with a solution comprising a swelling solvent, at least one organofluorosilane, a gelling agent, and an optional network-forming metal alkoxide. As the solution infuses into the polymeric material, the organofluorosilane, and optionally the network-forming metal alkoxide, are hydrolyzed and condensed through chemical reactions resulting in generation of the fluoropolysilicate network. This network interpenetrates the chains of the swollen polymer to form the fluoroinfused composite.

The relative depth of infusion is dependent on sample thickness. In one embodiment, the fluoroinfused composite comprises polymeric material wherein the portion interpenetrated with the fluoropolysilicate network comprises the surface and regions adjacent to the surface. By regions adjacent to the surface is meant a distance measurably below the surface to an additional depth within the polymeric material. The depth of the infusion is about 10 nm to about 100 micrometers from the surface of the swellable polymeric material. In other embodiments of the present invention, the portion infused with the fluoropolysilicate network encompasses the entire polymeric material. In most applications, however, the bulk of the polymeric material will not be infused unless the polymeric material possesses a thickness less than about 100 micrometers. The depth of the infusion within the composite is dependent on such factors as the nature of the polymeric material, its rate of swelling, the rate at which the organofluorosilane and/or other materials infuse into the polymeric material, and the time allowed for network formation.

The organofluorosilane is preferably a network-forming, fluorine-bearing silane material having a perfluorocarbyl segment and three network-forming groups and contains a fluoroalkyl group-silicon atom link or bond which is not subject to hydrolysis or thermal decomposition. Organofluorosilanes with less than three network-forming groups may also be used in preparing the composite provided that either an organofluorosilane with three network-forming groups, a network-forming metal alkoxide, or both an organofluorosilane with three network-forming groups and a network-forming metal alkoxide are also present. The organofluorosilane and/or network-forming metal alkoxide having three or more reactive bonds are present along with the organofluorosilane having less than three reactive bonds so as to provide an average of at least 3 reactive bonds per silicon atom. Preferably the organofluorosilane is selected from the group consisting of a compound of formula (I), (II) or (III) as described below:

(1) a compound of formula (I)

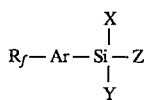 (I)

wherein $R_f$ has a maximum of 18 carbon atoms and is selected from the group consisting of
(a) perfluoroalkyl groups having at least 4 carbon atoms;
(b) —[CF$_2$CF(CF$_3$)O]$_n$—CF$_2$—CF$_2$—CF$_3$, wherein n is an integer of at least 1;
(c) —CF$_2$—(CF$_2$—O)$_m$—CF$_3$, wherein m is an integer of at least 2; and
(d) —CH$_2$—C(CF$_3$)$_2$—CF$_2$—CF$_2$—CF$_3$;

Ar is a divalent aromatic radical;

X is selected from the group consisting of
(e) alkyl of 1 to about 8 carbon atoms;
(f) $R_f$—Ar, wherein each of $R_f$ and Ar is as defined above;
(g) halogen atoms selected from the group consisting of chlorine, bromine, and iodine; and
(h) alkoxy groups of 1 to about 8 carbon atoms, carboxy groups of 1 to about 8 carbon atoms, or other groups attached through hydrolyzable bonds; and each of Y and Z independently is selected from the group consisting of (i) halogen atoms selected from the group consisting of chlorine, bromine, and iodine; (j) alkoxy groups of 1 to about 8 carbon atoms; and (k) carboxy groups of 1 to about 8 carbon atoms;

(2) a compound of formula (II):

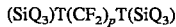 (II)

wherein:

Q is alkoxy of 1 to about 8 carbon atoms, acyloxy of 1 to about 8 carbon atoms, or halogen;

T is $(CR^2R^3)_k CR^4R^5CR^6R^7(CR^8R^9)_h$—;

$R^2$ to $R^9$ are each independently hydrogen, alkyl of 1 to about 8 carbon atoms or aryl, provided that at least one of $R^4$ to $R^7$ is hydrogen;

k and h are each independently an integer from 0 to 10, provided that at least one of k or h is zero; and p is an integer from 4 to 10; and (3) a compound of formula (III):

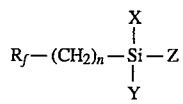 (III)

wherein:

n is an integer >1;

$R_f$ has a maximum of 18 carbon atoms and is selected from the group consisting of
(a) perfluoroalkyl groups having at least 4 carbon atoms;
(b) —[CF$_2$CF(CF$_3$)O]$_n$—CF$_2$—CF$_2$—CF$_3$, where n is an integer of at least 1;
(c) —CF$_2$—(CF$_2$—O)$_m$-CF$_3$, where m is an integer of at least 2; and
(d) —CH$_2$—C(CF$_3$)$_2$—CF$_2$—CF$_2$—CF$_3$;

Ar is a divalent aromatic radical;

X is selected from the group consisting of
(e) alkyl of 1 to about 8 carbons atoms;
(f) $R_f$—Ar, where each of $R_f$ and Ar is as defined above;
(g) halogen atoms selected from the group consisting of chlorine, bromine, and iodine; and
(h) alkoxy groups of 1 to about 8 carbon atoms, carboxy groups of 1 to about 8 carbon atoms, or other groups attached through hydrolyzable bonds; and each of Y and Z independently is selected from the group consisting of
(i) halogen atoms selected from the group consisting of chlorine, bromine, and iodine;
(j) alkoxy groups of 1 to about 8 carbon atoms; and (k) carboxy groups of 1 to about 8 carbon atoms.

In formula (I) and formula (III) above when X is selected from (e) alkyl of 1 to about 8 carbon atoms or (f) $R_f$—Ar, the resulting organofluorosilane will possess less than three reactive bonds. Therefore, the presence of another organofluorosilane with three reactive bonds and/or a network forming metal alkoxide will also be required. Other groups attached through hydrolyzable bonds as found in (h) of formula (I) and formula (III) comprise, for example, oximes.

Ar in formula (I) and formula (III), above, can be any divalent aromatic radical, as this term is understood in the art, including those containing the classic six-, ten-, and fourteen-carbon aromatic rings, including, for example, radicals remaining when two ring hydrogen atoms are removed from an aromatic compound such as benzene, naphthalene, toluene, xylene, and anthracene, or from a five-membered or six-membered heterocyclic ring containing oxygen or nitrogen atoms such as, for example, furan, pyrrole, and pyridine.

The $R_f$ group can be, i.a., a fluoroalkyl or perfluoroalkyl group, which can be either normal or branched, and preferably has more than four carbon atoms, especially more than six carbon atoms. Normal perfluoroalkyl groups include, for example, perfluorobutyl, perfluoropentyl, perfluorohexyl, perfluorodecyl, perfluorododecyl, and perfluorooctadecyl. Organosilanes of formula (I) and formula (III) where $R_f$ has more than eighteen carbon atoms are considered less practical to make, although such organosilanes would be perfectly suitable in all applications contemplated for this class of compounds. A typical suitable branched fluoroalkyl group is —CH$_2$—C(CF$_3$)$_2$—CF$_2$—CF$_2$—CF$_3$.

The $R_f$ groups also can be certain perfluoro[(alkyleneoxy)alkyl] radicals. These include perfluoro[methylene(polymethyleneoxy)methyl] radicals (c) and perfluoro[(polyisopropyleneoxy)propyl] radicals (b). The number of repeating perfluoroalkyleneoxy groups preferably is 3 or more in each case.

Typical alkoxy groups according to definition (h) of X and definition (j) of Y and Z are methoxy and ethoxy groups and normally will be lower alkoxy groups of up to 8 carbon atoms.

Synthesis of the compounds of formula (I) are described in U.S. Pat. No. 5,180,845 incorporated by reference herein and are afforded by organometallic reactions wherein the fluoroalkyl group and the silicon atom is attached to the dihalo aromatic in two sequential steps.

Synthesis of the compounds of formula (II) are described in WO 94/06807 and are afforded from hydrosilylation reactions, i.e., an addition reaction between a compound containing a Si—H group with a compound containing aliphatic unsaturation (C=C or —C≡C—) in the presence of a catalyst or free radical initiator. Reaction equations for the preparation of compounds of formula (II) are shown below.

(A) for h=0

(i)  CR$^7$CR$^6$=CR$^4$(CR$^3$R$^2$)$_k$(CF$_2$)$_p$(CR$^2$R$^3$)$_k$CR$^4$=CR$^6$
CR$^7$+H(CR$^8$R$^9$)$_h$SiQ$_3$→
Q$_3$Si(CR$^8$R$^9$)$_h$SiCR$^7$R$^6$CR$^4$(CR$^3$R$^2$)$_k$(CF$_2$)$_p$(CR$^2$R$^3$)$_k$CR$^4$HCR$^6$R$^7$Si(CR$^8$R$^9$)$_h$SiQ$_3$ (ii) reaction for preparation of reactant in equation (A) (i); k=1 or greater I(CF$_2$)$_p$I+CR$^7$R$^6$=CR$^4$(CR$^3$R$^2$)$_k$I(or Br)+Cu →
CR$^7$R$^6$=CR$^4$(CR$^3$R$^2$)$_k$(CF$_2$)$_p$(CR$^2$R$^3$)$_k$CR$^4$=CR$^6$R$^7$ (B) for k=0

(i) using an alkyl lithium reagent or lithium metal
ICR$^7$R$^6$CR$^5$R$^4$(CR$^2$R$^3$)$_k$(CF$_2$)$_p$(CR$^2$R$^3$)$_k$CR$^4$R$^5$CR$^6$R$^7$I+ 4(CH$_3$)$_3$CLi→
Q$^3$SiCR$^7$R$^6$CR$^5$R$^4$(CR$^2$R$^3$)$_k$(CF$_2$)$_p$(CR$^2$R$^3$)$_k$CR$^4$R$^5$CR$^6$R$^7$Si(CR$^8$R$^9$)$_h$SiQ$_3$ (ii) alternative to equation (B) (i) where instead of directly reacting the lithium reagent or metal with SiQ$_4$, it is converted to the Grignard which is reacted with SiQ$_4$; the Grignard being less reactive and giving higher yields of the end product

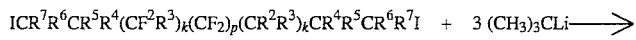

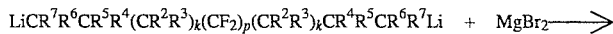

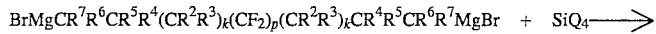

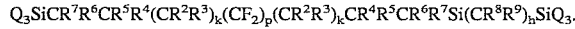

(C) for k=0; p=4, 6, or 8; and all R's=H:

I(CF$_2$)$_p$I+2 CR$^4$R$^5$=CR$^6$(CR$^8$R$^9$)$_h$SiQ$_3$→
Q$_3$Si(CR$^9$R$^8$)CR$^6$(I)
CR$^5$R$^4$(CR$^2$R$^3$)$_k$(CF$_2$)$_p$(CR$^2$R$^3$)$_k$CR$^4$R$^5$CR$^6$(I)(CR$^8$R$^9$)$_h$SiQ$_3$ which can be converted to Q$_3$Si(CR$^9$R$^8$)$_h$CR$^6$HCR$^5$R$^4$(CR$^2$R$^3$)$_k$(CF$_2$)$_p$(CR$^2$R$^3$)$_k$CR$^4$R$^5$CR$^6$H(CR$^8$R$^9$)$_h$SiQ$_3$ by standard organic techniques, e.g., using samarium iodide.

The reactants are employed in a ratio such that the compound containing the SiQ$_3$ group is employed in a molar excess of 10–50% to ensure completion of the hydrosilylation reaction. A transition metal catalyst such as platinum, or a free radical initiator is employed in an effective amount. Examples of suitable free radical initiators include VAZO® compounds available from E. I. du Pont de Nemours and Company, Wilmington, Del.

The reactions to produce the compounds of formula (II) can be conducted at a temperature of from about 25° C. to about 100° C. Preferably the process is conducted at about 80° C. to about 100° C. The pressure employed is typically ambient, about 1 atm (1.01×10$^5$ Pa). The reactions are carried out under an inert gas atmosphere, although use of an air atmosphere is not precluded. Reaction time is typically from about 4 hours to about 24 hours.

Use of a solvent is not required in the reactions to produce compounds of formula (II). Suitable solvents which may be employed are those capable of dissolving the reactants and which do not interfere with the reaction or generate unnecessary by-products. The desired product can be isolated by any means known to those skilled in the art. Preferably the desired product is isolated by removal of volatiles under reduced pressure. The catalyst can be removed by filtering through silica gel or activated charcoal.

Synthesis of the compounds of formula (II) may also be afforded from a metallation reaction between an alpha-omega diiodoalkylperfluoroalkane, e.g., contacted with tert-butyl lithium, followed by reaction with $Si(OC_2H_5)_4$, as shown above in Equation (B). Alternatively, unsaturated trialkoxysilanes or trihalosilanes can be inserted into the C—I bond of $I(CF_2)_pI$, followed by reduction of the C—I to C—H using standard organic reduction reagents as shown in Equation (C). Examples of suitable reagents are zinc metal, tri-n-butyl tin hydride or samarium iodide.

The fluorocarbon silanes of formula (III) are prepared by methods known in the art for hydrocarbon silanes (see, Kirk-Othmer, Encyclopedia of Chemical Technology, third edition, vol. 20, and Mehrota, R. C., Pure Appl. Chem., 13, 111; 1966). The preferred method is by reacting the corresponding perfluoroalkyl trichlorosilane with the proper alcohol, such as methanol, ethanol, or 1,1,1-trifluoroethanol, for example, according to the following equation:

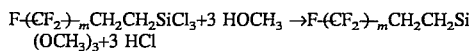

where m is 6–18.

The fluorinated trichlorosilane starting materials for the above reaction can be prepared by one of several recognized procedures; for example, see McBee, E. T., J. Am. Chem. Soc., 79, 2329 (1957); Adv. Organomet. Chem., 17, 407 (1979); U.S. Pat. No. 3,012,006; U.S. Pat. No. 4,089,882, or U.S. Pat. No. 4,549,003. The reaction of perfluoroalkylethylene with trichlorosilane, catalyzed by a platinum complex, is preferred for the preparation of perfluoroalkylethyltrichlorosilane because of the mild reaction conditions and the high yields and purity that are achievable.

The mole ratio of perfluoroalkylethyltrichlorosilane to the alcohol employed in the preparation of the silanes of formula (III) is usually stoichiometric (i.e., 1:3); however, a small excess of the alcohol may be used to force the reaction to completion. The value of m is preferably from 6 to 18 and may be composed of pure components, or more economically, of a mixture of components in this range. A mixture containing a distribution of components with an average m of 8 to 12 is most preferred. The yields from this reaction are essentially quantitative.

Any solvent inert to the reactants and products may be used in the reaction. If the reactants and products are liquid and mutually miscible under the reaction conditions, the solvent may be omitted. Solvents such as hexane, heptane, toluene and cyclohexane are suitable.

The temperatures suitable for the reactions used to prepare the silanes of formula (III) are those that will effect completion within a reasonable length of time. Temperatures ranging from about 0° C. to 160° C., or to the boiling point of the solvent, may be used. Usually temperatures of from about 25° C. to about 120° C. are employed. Reaction times of from about ½ hour up to 24 hours are usually adequate to complete the reaction.

Preferred organofluorosilanes of formula (I) are $C_8F_{17}$-$C_6H_4$-Si(OR)$_3$ and $(CF_3)_2C(C_3F_7)CH_2$-$C_6H_4$-Si(OR)$_3$ wherein R is methyl or ethyl. Preferred organofluorosilanes of formula (II) are those wherein p is even, for example, $(C_2H_5O)_3Si(CH_2)_6(CF_2)_{10}(CH_2)_6Si(OC_2H_5)_3$. Preferred organofluorosilane of formula (III) are $C_8F_{17}$—$(CH_2)_2$—Si—$(OCH_3)_3$ and $C_8F_{17}$—$(CH_2)_2$—$(OCH_2CH_3)_3$.

Preferred fluoroinfused composites comprise elastomer or semicrystalline polymers, with the fluoropolysilicate network formed using the organofluorosilanes, $C_8F_{17}$—$C_6H_4$—Si(OR)$_3$, $(CF_3)_2C(C_3F_7)CH_2$—$C_6H_4$—Si(OR)$_3$, $(RO)_3Si(CH_2)_6(CF_2)_{10}(CH_2)_6Si(OR_5)_3$, or $C_8F_{17}$—$(CH_2)_2$—Si—$(OR_3)_3$, wherein R is methyl or ethyl.

The fluoroinfused composites of the present invention exhibit a lower kinetic coefficient of friction when compared to the untreated polymeric material. Substantial reductions in kinetic coefficients of friction of the fluoroinfused composite as compared to the untreated polymeric material (by a factor of four in some instances) are realized, as well as reductions in surface energy and surface roughness. Surface energy is measured via contact angle measurements using the sessile drop method, wherein the surface energy of a sample is related to the contact angle θ according to the equation: $\cos \theta = -1 + 2(\gamma_1^d \gamma_s^d)^{1/2}/\gamma_1^d$, where the superscript d refers to the dispersive component of the liquid or solid free energies γ, l=liquid, and s=solid. (See S. Wu, *Polymer Interface and Adhesion*, Chapter 8, Marcel Dekker, Inc., New York, N.Y., 1982 and B. Sauer, J. of Adhesion Science, Vol. 6, p. 955 (1992)). Average surface roughness is determined by a Tencor P-2 surface profilometer (Tencor Instruments, Mountain View, Calif.). Surface energies normally associated only with fluoropolymers can be obtained. As shown in Example 2, a photocopier roll treated by the process of this invention, successfully completed 240,000 cycles (including 1,000 100% black, double-sided cycles) in a copier test, exceeding the performance of the formerly used spray-on fluoropolymer coating.

Infusion of the fluoropolysilicate network onto and within the polymeric material further provides an interface-free surface modification. By interface-free is meant the absence of a distinct boundary between the fluoropolysilicate network and the polymeric material. This absence of a conventional interface circumvents the problem of very poor adhesion of fluoropolymers to many polymeric materials. In the present invention, fluorine is concentrated at the surface and regions adjacent to the surface of the fluroinfused composite with no conventional interface. Surface analysis by Electron Spectroscopy for Chemical Analysis (ESCA) (Example 7) indicates that fluorine atoms constitute about 20 atomic percent of the chemical species in the uppermost 10 nm thickness of the sample prepared in Example 3, and that within the limits of resolution of the technique, the composite is invariant over that depth.

The fluoroinfused composites of the present invention are useful in a variety of articles, for example, as the outer layer of photocopier pressure and fuser rolls, laser jet printer rolls, and plain paper copier/facsimile machine rolls. Fluoroinfused composites wherein the polymeric material is in the shape of a gasket, O ring, wiper blade, packaging film, flexible tubing, fibers and their like are also useful.

This invention also provides a process for the production of the above-described fluoroinfused composite which comprises preparing a solution comprising at least one organofluorosilane, a swelling solvent, a gelling agent, and an optional network-forming metal alkoxide; contacting a swellable polymeric material with the solution; removing the polymeric material from the solution after allowing sufficient time for swelling and network formation to occur; and removing the solvent from the polymeric material to obtain the fluoroinfused composite.

The process of the present invention modifies a portion of the polymeric material, usually the surface and regions adjacent to the surface of the polymeric material, by taking advantage of the swellable natures of selected polymeric materials as described above and using this swellability to bring about the infusion of the network-forming, fluorine-bearing silane material into the swollen zone. Then, by hydrolysis and condensation through reaction with a gelling agent, the silane material is embedded within chains of the polymer and mechanically locked in place via formation of a fluoropolysilicate network. There is thus generated a modified portion of the polymeric material comprising the surface and regions adjacent to the surface which is not dependent on adhesion to the polymeric surface but upon generation of an interpenetrating network in a portion at and adjacent to the surface of the polymeric material. Silicon atoms bearing hydrolyzed groups become constituents of the network structure via bonds to other silicon atoms through oxygen.

It is first necessary to choose the polymeric material and organofluorosilane desired for the final composite. Typically, 0.1 to about 10 weight % of organofluorosilane is used in the solution. A solvent is then chosen. Suitable swelling solvents comprise those capable of dissolving the organofluorosilane and the optional network-forming metal alkoxide, and at the same time capable of swelling the polymeric material without dissolving it. Suitable solvents comprise methylene chloride, methylethyl ketone, tetrahydrofuran, toluene, benzene, ethyl acetate and 1,1,2-trichlorotrifluoroethane. Methylene chloride is preferred for swelling silicone rubber, polyvinyl chloride, ethylene/propylene/hexadiene rubber and polyethylene terephthalate. The organofluorosilane and the optional network-forming metal alkoxide are dissolved in the solvent by mixing or other appropriate means known in the art.

The polymeric material is swollen through contact with a solution comprising the swelling solvent either initially as a pretreatment or in the presence of the at least one organofluorosilane, gelling agent, and optional network-forming metal alkoxide. Thus, hydrolysis and condensation may or may not be carried out at the same time as the absorption of the solvent by the polymeric material.

For hydrolysis and condensation and hence network formation to occur a gelling agent is required, although in some instances its presence will not be readily apparent. The gelling agent may be water, either supplied, adventitious or atmospheric; a basic material such as ammonium hydroxide or fluoride ion; or an acidic material such as HCl or an organic carboxylic acid. Preferred carboxylic acids contain at most 20 mol% water and should have a $pk_a$ value not higher than about 4.0. Examples of carboxylic acids effective in the present invention comprise formic acid, monochloroacetic acid, dichloroacetic acid, trifluoroacetic acid, and hydroxyacetic acid. Formic acid and trifluoroacetic acid are preferred.

When water is the gelling agent, a catalyst is normally present. Suitable catalysts comprise Bronsted acids or weak bases where pH <9, e.g., hydrogen fluoride, sodium fluoride, hydrochloric acid, acetic acid and ammonium hydroxide.

Contacting the polymeric material with the above described solutions is achieved by immersion of the polymeric material in the solution. The polymeric material may be quickly dipped or soaked for a longer period of time depending on the time needed to allow swelling and some network formation to occur. The time required for these reactions can vary widely depending on factors such as temperature, the nature of the polymeric material, and the nature of the solvent. Network formation can occur rapidly or require several hours. Typically, the solutions are maintained at a temperature within the range of about 0–100° C., and immersion time will range from about one minute to several hours.

Pressure over the infusion or network-forming reaction is not critical. Although subatmospheric pressure may not be particularly practical, high pressure may be advantageous to promote infusion. Typically the reaction is carried out at atmospheric pressure.

The fluoroinfused composite is isolated via removal of solvent, liquid byproducts and unreacted starting materials through evaporation which may be effected by air drying at ambient temperature and/or by heating at elevated temperature such as in an oven. Drying with heating not only removes solvent but facilitates crosslinking of the fluoropolysilicate network. Optionally, the process of the present invention further comprises a heating step wherein the fluoroinfused composite is heated concurrently with or subsequent to the removal of the solvent from the polymeric material. The network is retained after the solvent and volatile byproducts evaporate and will not leach or volatilize out. In addition, the network is not extractable after its formation within a portion of the polymeric material.

In an embodiment wherein the fluoroinfused composite is prepared by pretreating the polymeric material with a first solution comprising a swelling solvent, this first solution may optionally further comprise either at least one organofluorosilane or a gelling agent. The pretreated polymeric material is removed from the first solution and then contacted with a second solution. The first and second solution may be in separate containers which is preferred, or the second solution may be added to the container holding the first solution. The second solution comprises the solvent, and one from the group consisting of: (i) a gelling agent and at least one organofluorosilane, provided an organofluorosilane is not present in the first solution; (ii) a gelling agent, provided the first solution comprises a solvent and at least one organofluorosilane, and a gelling agent is not in the first solution; and (iii) at least one organofluorosilane, provided the first solution comprises a solvent and a gelling agent, and an organofluorosilane is not present in the first solution. The polymeric material is removed from the second solution after allowing sufficient time for network formation to occur, and the solvent is removed from the polymeric material to obtain the fluoroinfused composite. Optionally, this process further comprises a heating step wherein the fluoroinfused composite is heated concurrently with or subsequent to the removal of the solvent from the polymeric material.

In another embodiment of the process of the present invention, network-forming metal alkoxides such as tetraalkoxysilanes may be added to the solution comprising the organofluorosilane. In the process wherein the polymeric material is pretreated with a first solution, the optional metal alkoxide is found in the solution (first or second) containing the organofluorosilane, or it is found in the first solution for those processes wherein group (i) is the second solution, and there is no gelling agent in the first solution, or it is found in the second solution for those processes wherein group (ii) is the second solution. The metal alkoxide additive increases the number of network bonds during the formation of the interpenetrating network. Examples of optional network-forming metal alkoxides comprise alkoxides of Al,B, Si, Sn, Ti, and Zr and fluoroalkoxides of Al, B, Si, and Sn. Also useful are various other aluminum compounds, such as aluminum phosphate. Preferred metal alkoxides are silanes such as tetramethoxysilane, tetraethoxysilane, tetrapropoxysilane; other compounds under the class of silicon alkoxides represented by $Si(OR_z)_4$, wherein $R_z$ is a methyl, ethyl, n-propyl, iso-propyl, n-butyl, sec-butyl or iso-butyl alkyl; silicon fluoroalkoxides such as $\{(CF_3)_nCH_2O\}_4Si$, wherein n=1 to about 8; and alkyl titanates such as $Ti(OR_z)_4$ and aluminates such as $Al(OR_z)_3$, and $\{(CF_3)_nCH_2O\}_3Al$ wherein $R_z$ and n are defined as for the silicon alkoxides and fluoroalkoxides.

The processes of this invention are useful to modify the characteristics of a portion of the polymeric material comprising the surface and regions adjacent to the surface. This portion of the fluoroinfused composite exhibits low surface energy, increased abrasion resistance and improved release characteristics as compared to untreated surfaces or regions adjacent to the surface of the polymeric material.

This invention further provides articles of manufacture comprising the fluoroinfused composites described above. Examples of articles comprise photocopier pressure and fuser rolls, plain paper copier/facsimile machine rolls, and laser jet printer rolls whose outer layer comprises the fluoroinfused composite of the present invention. For example, silicone rubber is extruded, molded or coated via conventional means onto metal cores, such as aluminum or steel, and treated by the processes described above to yield photocopier fuser and pressure rolls, plain paper copier/facsimile rolls and laser jet printer rolls. Gaskets, O rings, packaging film, fibers, and flexible tubing comprising fluoroinfused composites are also provided. Polymeric material in the shape of a gasket, O-ring, packaging film, fiber, or flexible tubing is subjected to a process of the present invention described herein to yield a gasket, O-ring, packaging film, fiber, or flexible tubing comprising the fluoroinfused composite of the present invention, thus imparting to the article improved properties such as low surface energy and a lower kinetic coefficient of friction as compared to the untreated article.

EXAMPLES

Materials: $(C_2H_5O)_3Si(CH_2)_6(CF_2)_{10}(CH_2)_6Si(OC_2H_5)_3$. $C_8F_{17}$—$C_6H_4$—$Si(OCH_3)_3$ and $(CF_3)_2C(C_3F_7)CH_2$—$C_6H_4$—$Si(OCH_3)_3$ can be prepared using the procedures described above. Silicone rubber was obtainted from Katun Corp., Minneapolis, Minn. Ethylene/propylene/hexadiene rubber was obtained from Prince Rubber & Plastic Co., Baton Rouge, La. Butyl rubber was obtained from West Co., Phoenixville, Pa. $Si(OC_2H_5)_4$ was obtained from Kodak Co., Rochester, N.Y.

EXAMPLE 1

Decrease of Surface Energy of Silicone Rubber

A sample of a silicone rubber (cross-linked poly(dimethylsiloxane) believed to contain some iron oxide as a filler) as a 4 mm thick coating on a 40 mm diameter aluminum tube was immersed in a 0.4% by weight solution of a fluoroalkysilane, $(C_2H_5O)_3Si(CH_2)_6(CF_2)_{10}(CH_2)_6Si(OC_2H_5)_3$, in methylene chloride for 16 hrs at room temperature. The solvent was an effective swelling agent for the rubber. After removal from the solution, the sample was allowed to air dry thoroughly and was subjected to contact angle measurements using the sessile drop method. The surface energy of the sample is related to the contact angle θ according to the equation: $\cos\theta = -1 + 2(\gamma_1^d \gamma_s^d)^{1/2}/\gamma_1^d$, where the superscript d refers to the dispersive component of the liquid or solid free energies γ, l=liquid, and s=solid.

Both water and methylene iodide showed larger contact angles on the treated silicone than on an untreated control, per the Table below. The average surface roughness, as determined by a Tencor P-2 surface profilometer, showed a reduction of approximately 40% after the treatment.

TABLE 1

|  | Untreated Silicone | Contact Angles (°) Fluoroinfused Composite |
|---|---|---|
| $H_2O$ Advancing | 115 | 123 |
| $H_2O$ Receding | 17 | 40 |
| $CH_2I_2$ Advancing | 75 | 90 |
| $CH_2I_2$ Receding | 13 | 45 |

EXAMPLE 2

Silane Release Characteristics of Treated Roll in Photocopier

A cylindrical silicone rubber pressure roll was manufactured by Toshiba Corp., Japan. The roll was 30 cm in length, 4 cm in diameter and was overcoated with a thin fluoropolymer layer. The overcoat was readily removed due to its poor adhesion to the rubber. After the removal of the fluoropolymer layer, the sample was treated in the manner of Example 1, except that the concentration of fluoroalkylsilane was 1.17% by weight, and the immersion time was 30 min. After air drying at room temperature, the roll was heated to 109° in air for 63 min. The treated roll was subjected to 1000 xerographic copies under "abusive" conditions of duplex (double sided), 100% black operation. This exposure was followed by 240,000 copies under normal use conditions in an office copier. After these operations, no significant degradation in the roll or its performance was detected. An untreated control silicone roll would have suffered an unacceptable level of surface contamination under these conditions.

EXAMPLE 3

Decrease of Surface Energy of Silicone Rubber from $C_8F_{17}C_6H_4Si(OCH_3)_3$

A small cylindrical disk of silicone rubber similar in composition to that used in Examples 1 and 2 was immersed in a 1.0% by weight solution of the fluoroalkylsilane of Example 2 in ethyl acetate for 30 min. After air drying, the specimen showed advancing contact angles for methylene iodide and n-hexadecane of 102° and 61°, respectively. An untreated control sample showed contact angles of 76° and 30°, for the same fluids.

EXAMPLE 4

Decrease of Surface Energy of EPDM Rubber from $C_8F_{17}$—$C_6H_4$—$Si(OCH_3)_3$ A small cylindrical disk of ethylene/propylene/hexadiene (EPDM) rubber was treated with a 1.0% by weight solution of $C_8F_{17}$—$C_6H_4$—$Si(OCH_3)_3$ in methylene chloride. After air drying, the specimen showed advancing contact angles for methylene iodide and n-hexadecane of 120° and 98°, respectively. An untreated control sample showed contact angles of 77° and 28°, for the same fluids.

EXAMPLE 5

Decrease of Kinetic Coefficient of Friction for Silicone Rubber from $C_8F_{17}$—$C_6H_4$—$Si(OCH_3)_3$ A rectangular slab of silicone rubber approximately 5×15 cm and 3 mm thick was treated with a 1.0% by weight solution of $C_8F_{17}$—$C_6H_4$—$Si(OCH_3)_3$ in methylene chloride for 5 min. The kinetic coefficient of friction (C.O.F.) was evaluated by determining the force necessary to drag a 26×25 mm stainless steel sled under a 200 g load across the surface of both treated and unmodified rubber. The force was measured with a digital force gauge. The procedure is a modification of ASTM test D-1894-90. Some of the untreated samples showed stick-slip behavior so pronounced that measurements were difficult. The C.O.F. for untreated rubber ranged from 1.93 to >1.96; the values for treated materials ranged from 0.48 to 0.53.

EXAMPLE 6

Decrease of Surface Energy of Silicone Rubber from $(CF_3)_2C(C_3F_7)CH_2$—$C_6H_4$—$Si(OCH_3)_3$ A small cylindrical disk of silicone rubber was treated in the manner of Example 3 with $(CF_3)_2C(C_3F_7)CH_2$—$C_6H_4$—$Si(OCH_3)_3$ dissolved in methylene chloride for 5 min. The air dried sample showed a contact angle with n-hexadecane of 66° and 30° in a control sample.

EXAMPLE 7

Fluorine Content Determination by Electron Spectroscopy for Chemical Analysis (ESCA)

The sample of Example 3 was subjected to surface analysis by ESCA. This technique is capable of determining elemental composition of the region of the material within approximately 10 nm of the surface. Data were acquired using 30° and 90° angular incidence of the electron beam so as to provide depth resolution. The data indicated that fluorine atoms constituted approximately 20 atomic percent of the chemical species in the uppermost 10 nm and that, within the limits of resolution of the technique, the composition was invariant over that depth.

EXAMPLE 8

Decrease of Kinetic Coefficient of Friction for EPDM Rubber from $C_8F_{17}$—$C_6H_4$—$Si(OCH_3)_3$ A rectangular slab of EPDM rubber resulting from the treatment in Example 4 was evaluated for kinetic coefficient of friction in the manner of Example 5. The C.O.F. for untreated rubber was 1.31; the value for the treated material was 0.34.

EXAMPLE 9

Decrease of Surface Energy of Polyester Thermoplastic Elastomer

A sample of DuPont HYTREL® 7246 polyester thermoplastic elastomer (E. I. du Pont de Nemours and Company, Wilmington, Del.) was immersed in a methylene chloride solution containing 1.0% by weight of $C_8F_{17}$—$C_6H_4$—$Si(OCH_3)_3$ and 0.62% formic acid (96%) as a gelling agent for 4 min. at room temperature. The solvent was an effective swelling agent for the elastomer. After removal from the solution, the sample was allowed to air dry thoroughly and was subjected to contact angle measurement as in Example 1. The advancing angle for hexadecane was 77° in the treated sample and 0° (the surface was completely wet) in an untreated control sample.

EXAMPLE 10

Decrease of Surface Energy of Poly(vinyl chloride) (PVC)

A section of TYGON® plasticized PVC tubing (Norton Performance Plastics, Wayne, N.J.) was immersed in a methylene chloride solution containing 1.0% by weight of $C_8F_{17}$—$C_6H_4$—$Si(OCH_3)_3$ and 0.62% formic acid (96%) for 5 min. at room temperature. After removal from the solution, the sample was allowed to air dry thoroughly and was subjected to contact angle measurement on the exterior surface of the tubing, as in Example 1. The advancing angle for hexadecane was 50° in the treated sample and 0° (the surface was completely wet) in an untreated control sample.

EXAMPLE 11

Decrease of Surface Energy of Poly(ethylene terephthalate) (PET)

A piece of DuPont MYLAR® polyester sheet (E. I. du Pont de Nemours and Company, Wilmington, Del.) 125 micrometers thick was immersed in the same solution used in Example 10 for 5 min. at room temperature. After removal from the solution, the sample was allowed to air dry thoroughly and was subjected to contact angle measurement on the exterior surface of the tubing, as in Example 1. The advancing angle for hexadecane was 29° in the treated sample and 5° in an untreated control sample.

EXAMPLE 12

Decrease of Surface Energy of Poly(ethylene terephthalate) by Presoaking

The procedure of Example 11 was followed except that the polymer film was presoaked in the combination of silane and solvent for 5 min., then immersed in the coating solution (i.e., including formic acid) used in Example 11 for 5 min. When dried, the sample showed water and methylene iodide contact angles of 108° and 100°, respectively. An untreated control sample had corresponding contact angles of 76° and 28°. The surface energy of the sample was calculated (S. Wu, *Polymer Interface and Adhesion*, Marcel Dekler, N.Y. (1982), Ch. 5) to be 15.8 dyne/cm (15.8×10$^{-7}$ newton meter). That of untreated Mylar was 46.2 dyne/cm (46.2×10$^{-7}$ newton meter). The literature value for polytetrafluoroethylene is ca. 22.5 dyne/cm (22.5×10$^{-7}$ newton meter) (S. Wu, *Polymer Interface and Adhesion*, Marcel Dekler, N.Y. (1982), Ch. 5). The sample also showed higher contact angles than those prepared without the presoak treatment.

EXAMPLE 13

Decrease of Surface Energy of Butyl Rubber with $C_8F_{17}$—$C_6H_4$—$Si(OCH_3)_3$ A small disk of butyl rubber was immersed in a solution of 1.0% $C_8F_{17}$—$C_6H_4$—$Si(OCH_3)_3$ and 5.8% formic acid in tetrahydrofuran for 5 min. The solution had been prepared 45 min. prior to the immersion. The sample was then removed, and the solvent and other volatile species allowed to evaporate at room temperature. The advancing contact angle with methylene iodide was measured as per Example 1 to be 103°. An untreated control showed a contact angle of 61° with the same contact fluid.

EXAMPLE 14

Decrease of Surface Energy of Butyl Rubber with $(CF_3)_2C(C_3F_7)CH_2$—$C_6H_4$—$Si(OCH_3)_3$ A small disk of butyl rubber was immersed in a solution of 1.0% $(CF_3)_2C(C_3F_7)CH_2$—$C_6H_4$—$Si(OCH_3)_3$ and 5.8% trifluoroacetic acid in 1,1,2-trichlorotrifluoroethane for 5 min. The solution had been prepared for 15 min. prior to the immersion. The sample was then removed, and the solvent and other volatile species allowed to evaporate at room temperature. The advancing contact angle for silicone fluid 704 [1,1,3,3-tetramethyltetraphenyltrisiloxane] was measured as per Example 1 to be 94°. An untreated control showed a contact angle of 31° with the same contact fluid.

EXAMPLE 15

Decrease of Surface Energy of Butyl Rubber with $C_8F_{17}$—$C_6H_4$—$Si(OCH_3)_3$ + $Si(OC_2H_5)_4$ A solution of $C_8F_{17}$—$C_6H_4$—$Si(OCH_3)_3$ and the nonfluorinated tetraalkoxysilane $Si(OC_2H_5)_4$ (each 1.0% by weight) and formic acid (0.52%) in tetrahydrofuran was heated to 65° for 6 hours prior to use. A small disk of butyl rubber was treated as in Example 13. The contact angle for silicone fluid 704 was 68°; that of the control was 31°.

EXAMPLE 16

Decrease of Surface Energy of Poly(Ethylene/Vinyl Acetate)

A small disk of poly(ethylene-co-vinyl acetate) was soaked for one minute in a solution of $C_8F_{17}$—$C_6H_4$—$Si(OCH_3)_3$ (1.0% by weight), $Si(OC_2H_5)_4$ (0.33%) and formic acid (0.52%) in ethyl acetate. After the material was removed from the solution and dried, the contact angle for hexadecane was 59°; that of the untreated control was 35°.

EXAMPLE 17

Decrease of Surface Energy of Polyurethane Rubber with $C_8F_{17}$—$C_6H_4$—$Si(OCH_3)_3$ A strip of polyurethane rubber (Katun Corp., Minneapolis, Minn.) ca. 3 mm thick was immersed for 5 min. in a solution containing 10% $C_8F_{17}$—$C_6H_4$—$Si(OCH_3)_3$ and 6.2% formic acid in tetrahydrofuran. When removed from the solution and dried, the surface of the rubber showed a contact angle with hexadecane of 65°; that of the untreated control was 34°.

What is claimed is:

1. A fluoroinfused composite, comprising: a swellable polymeric material having all or a portion thereof interpenetrated with a fluoropolysilicate network.

2. The fluoroinfused composite of claim 1, wherein the swellable polymeric material comprises a polymer selected from the group consisting of: elastomers and semicrystalline polymers.

3. The fluoroinfused composite of claim 1, wherein the polymeric component is selected from the group consisting of: silicone rubber, butyl rubber, hexafluoropropylene/difluorovinylidene co-polymer, ethylene/propylene/hexadiene rubber, polyurethane, block copolymers of polybutylene terephthalate and polyether glycol, polyethylene terephthalate, polypropylene, poly(ethylene/vinyl acetate) and polyvinyl chloride.

4. The fluoroinfused composite of claim 3 wherein, the polymeric component is silicone rubber or ethylene/propylene/hexadiene rubber.

5. The fluoroinfused composite of claim 1, wherein the interpenetrated portion of the polymeric material comprises the surface and regions adjacent to the surface of the polymeric material.

6. The fluoroinfused composite of claim 1, wherein the fluoropolysilicate network is formed from an organofluorosilane having a perfluorocarbyl segment and three network-forming groups.

7. The fluoroinfused composite of claim 1, wherein the fluoropolysilicate network is formed from at least one organofluorosilane selected from the group consisting of:

(1) a compound of formula (I)

wherein $R_f$ has a maximum of 18 carbon atoms and is selected from the group consisting of
(a) perfluoroalkyl groups having at least 4 carbon atoms;
(b) —$[CF_2CF(CF_3)O]_n$—$CF_2$—$CF_2$—$CF_3$, wherein n is an integer of at least 1;
(c) —$CF_2$—$(CF_2$—$O)_m$—$CF_3$, wherein m is an integer of at least 2; and
(d) —$CH_2$—$C(CF_3)_2$—$CF_2$—$CF_2$—$CF_3$;

Ar is a divalent aromatic radical;
X is selected from the group consisting of
(e) alkyl of 1 to about 8 carbon atoms;
(f) $R_f$—Ar, where each of $R_f$ and Ar is as defined above;
(g) halogen atoms selected from the group consisting of chlorine, bromine, and iodine; and
(h) alkoxy groups of 1 to about 8 carbon atoms, carboxy groups of 1 to about 8 carbon atoms, or other groups attached through hydrolyzable bonds; and each of Y and Z independently is selected from the group consisting of
(i) halogen atoms selected from the group consisting of chlorine, bromine, and iodine;
(j) alkoxy groups of 1 to about 8 carbon atoms; and
(k) carboxy groups of 1 to about 8 carbon atoms;

(2) a compound of formula (II):

wherein:
Q is alkoxy of 1 to about 8 carbon atoms, acyloxy of 1 to about 8 carbon atoms, or halogen;
T is $(CR^2R^3)_kCR^4R^5CR^6R^7(CR^8R^9)_h$—;
$R^2$ to $R^9$ are each independently hydrogen, alkyl of 1 to about 8 carbon atoms or aryl, provided that at least one of $R^4$ to $R^7$ is hydrogen;
k and h are each independently an integer from 0 to 10, provided that at least one of k or h is zero; and
p is an even integer from 4 to 10; and
(3) a compound of formula (III)

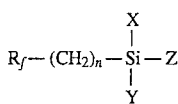
(III)

wherein:

n is an integer >1;

$R_f$ has a maximum of 18 carbon atoms and is selected from the group consisting of
(a) perfluoroalkyl groups having at least 4 carbon atoms;
(b) —$[CF_2CF(CF_3)O]_n$—$CF_2$—$CF_2$—$CF_3$, wherein n is an integer of at least 1;
(c) —$CF_2$—$(CF_2$—$O)_m$—$CF_3$, wherein m is an integer of at least 2; and
(d) —$CH_2$—$C(CF_3)_2$—$CF_2$—$CF_2$—$CF_3$;

Ar is a divalent aromatic radical;

X is selected from the group consisting of
(e) alkyl of 1 to about 8 carbon atoms;
(f) $R_f$—Ar, where each of $R_f$ and Ar is as defined above;
(g) halogen atoms selected from the group consisting of chlorine, bromine, and iodine; and
(h) alkoxy groups of 1 to about 8 carbon atoms, carboxy groups of 1 to about 8 carbon atoms, or other groups attached through hydrolyzable bonds; and each of Y and Z independently is selected from the group consisting of
(i) halogen atoms selected from the group consisting of chlorine, bromine, and iodine;
(j) alkoxy groups of 1 to about 8 carbon atoms; and
(k) carboxy groups of 1 to about 8 carbon atoms.

8. The fluoroinfused composite of claim 7, wherein the organofluorosilane is selected from the group consisting of: $C_8F_{17}$—$C_6H_4$—$Si(OR)_3$, $(CF_3)_2C(C_3F_7)CH_2$—$C_6H_4$—$Si(OR)_3$, $(RO)_3Si(CH_2)_6(CF_2)_{10}(CH_2)_6Si(OR)_3$, and $C_8F_{17}(CH_2)_2Si(OR)_3$, wherein R is methyl or ethyl.

9. The fluoroinfused composite of claim 1, wherein the surface of the composite exhibits a lower kinetic coefficient of friction than the surface of the untreated swellable polymeric material.

10. The fluoroinfused composite of claim 1, wherein the surface of the composite exhibits a lower surface energy than the surface of the untreated swellable polymeric material.

11. The fluoroinfused composite of claim 1 wherein the polymeric material is in the shape of a gasket, O ring, packaging film, fiber, or flexible tubing.

12. A photocopier roll, comprising a composite of claim 1.

13. A laser printer roll, comprising a composite of claim 1.

14. A wiper blade, comprising a composite of claim 1.

15. A process for production of a fluoroinfused composite comprising a swellable polymeric material having a portion thereof interpenetrated with a fluoropolysilicate network, comprising:
(a) preparing a solution comprising at least one organofluorosilane, a swelling solvent and a gelling agent;
(b) contacting the swellable polymeric material with the solution of step (a);
(c) removing the swellable polymeric material from the solution after allowing sufficient time for swelling and network formation to occur; and
(d) removing the solvent from the polymeric material to obtain the fluoroinfused composite.

16. The process of claim 15, wherein the solution further comprises a network-forming metal alkoxide.

17. The process of claim 15, wherein the swellable polymeric material comprises a polymer selected from the group consisting of elastomers and semi-crystalline polymers.

18. The process of claim 15, wherein the swellable polymeric material comprises a polymer selected from the group consisting of: silicone and ethylene/propylene/hexadiene rubber.

19. The process of claim 15 further comprising step (e):
(e) heating the fluoroinfused composite concurrently with or subsequent to step (d).

20. The process of claim 15, wherein the organofluorosilane is selected from the group consisting of:

(1) a compound of formula (I)

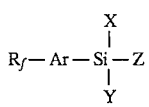
(I)

wherein $R_f$ has a maximum of 18 carbon atoms and is selected from the group consisting of
(a) perfluoroalkyl groups having at least 4 carbon atoms;
(b) —$[CF_2CF(CF_3)O]_n$—$CF_2$—$CF_2$—$CF_3$, wherein n is an integer of at least 1;
(c) —$CF_2$—$(CF_2$—$O)_m$—$CF_3$, wherein m is an integer of at least 2; and
(d) —$CH_2$—$C(CF_3)_2$—$CF_2$—$CF_2$—$CF_3$;

Ar is a divalent aromatic radical;

X is selected from the group consisting of
(e) alkyl of 1 to about 8 carbon atoms;
(f) $R_f$—Ar, where each of $R_f$ and Ar is as defined above;
(g) halogen atoms selected from the group consisting of chlorine, bromine, and iodine,; and
(h) alkoxy groups of 1 to about 8 carbon atoms, carboxy groups of 1 to about 8 carbon atoms, or other groups attached through hydrolyzable bonds; and each of Y and Z independently is selected from the group consisting of
(i) halogen atoms selected from the group consisting of chlorine, bromine, and iodine;
(j) alkoxy groups of 1 to about 8 carbon atoms; and
(k) carboxy groups of 1 to about 8 carbon atoms;

(2) a compound of formula (II):

$(SiQ_3)T(CF_2)_pT(SiQ_3)$ (II)

wherein:

Q is alkoxy of 1 to about 8 carbon atoms, acyloxy of 1 to about 8 carbon atoms, or halogen;

T is $(CR^2R^3)_kCR^4R^5CR^6R^7(CR^8R^9)_h$—;

$R^2$ to $R^9$ are each independently hydrogen, alkyl or 1 to about 8 carbon atoms or aryl, provided that at least one of $R^4$ to $R^7$ is hydrogen;

k and h are each independently an integer from 0 to 10, provided that at least one of k or h is zero; and p is an even integer from 4 to 10; and (3) a compound of formula (III)

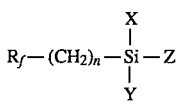

(III)

wherein:

n is an integer >1;

$R_f$ has a maximum of 18 carbon atoms and is selected from the group consisting of
(a) perfluoroalkyl groups having at least 4 carbon atoms;
(b) —$[CF_2CF(CF_3)O]_n$—$CF_2$—$CF_2$—$CF_3$, wherein n is an integer of at least 1;
(c) —$CF_2$—$(CF_2$—$O)_m$—$CF_3$, wherein m is an integer of at least 2; and
(d) —$CH_2$—$C(CF_3)_2$—$CF_2$—$CF_2$—$CF_3$;

Ar is a divalent aromatic radical;

X is selected from the group consisting of
(e) alkyl of 1 to about 8 carbon atoms;
(f) $R_f$—Ar, where each of $R_f$ and Ar is as defined above;
(g) halogen atoms selected from the group consisting of chlorine, bromine, and iodine; and
(h) alkoxy groups of 1 to about 8 carbon atoms, carboxy groups of 1 to about 8 carbon atoms, or other groups attached through hydrolyzable bonds; and each of Y and Z independently is selected from the group consisting of
(i) halogen atoms selected from the group consisting of chlorine, bromine, and iodine;
(j) alkoxy groups of 1 to about 8 carbon atoms; and
(k) carboxy groups of 1 to about 8 carbon atoms.

21. The process of claim 20, wherein the organofluorosilane is selected from the group consisting of $C_8F_{17}$—$C_6H_4$—$Si(OR)_3$, $(CF_3)_2C(C_3F_7)CH_2$—$C_6H_4$—$Si(OR)_3$, $(RO)_3Si(CH_2)_6(CF_2)_{10}(CH_2)_6Si(OR)_3$, and $C_8F_{17}(CH_2)_2Si(OR)$, wherein R is methyl or ethyl.

22. The process of claim 21, wherein the organofluorosilane is $(C_2H_5O)_3Si(CH_2)_6(CF_2)_{10}(CH_2)_6Si(OC_2H_5)_3$.

23. A process for the production of a fluoroinfused composite comprising a swellable polymeric material having a portion thereof interpenetrated with a fluoropolysilicate network, comprising the steps of:

(a) pretreating a swellable polymeric material with a first solution comprising a swelling solvent, said first solution optionally further comprising either at least one organofluorosilane or a gelling agent;

(b) contacting the pretreated polymeric material with a second solution comprising the solvent and one from the group consisting of: (i) a gelling agent and at least one organofluorosilane, provided an organofluorosilane is not present in the first solution; (ii) a gelling agent, provided the first solution comprises a solvent and at least one organofluorosilane, and a gelling agent is not present in the first solution; and (iii) at least one organofluorosilane, provided the first solution comprises a solvent and a gelling agent, and an organofluorosilane is not present in the first solution, wherein when the gelling agent is water a separate catalyst is added;

(c) removing the polymeric material from the second solution after allowing sufficient time for network formation to occur; and (d) removing the solvent from the polymeric material to obtain the fluoroinfused composite.

24. The process of claim 23 wherein the solution comprising the organofluorosilane further comprises a network-forming metal alkoxide.

\* \* \* \* \*